United States Patent Office 3,695,859
Patented Oct. 3, 1972

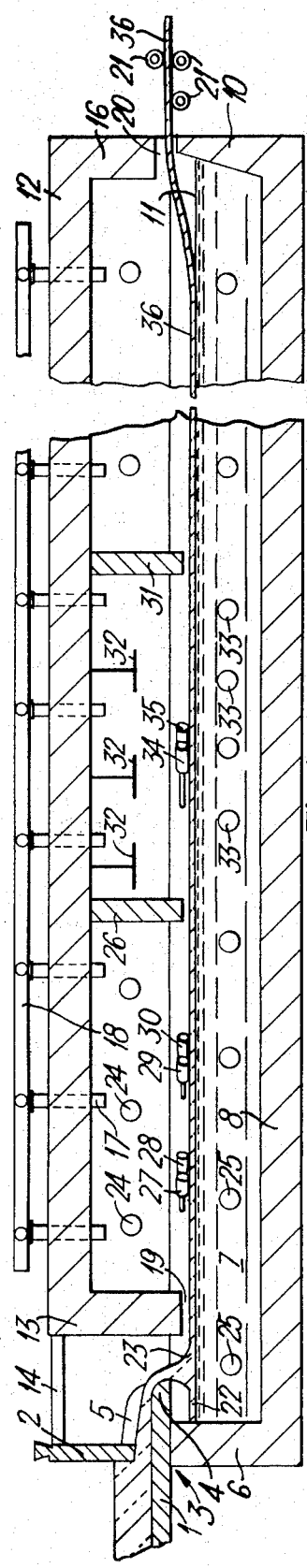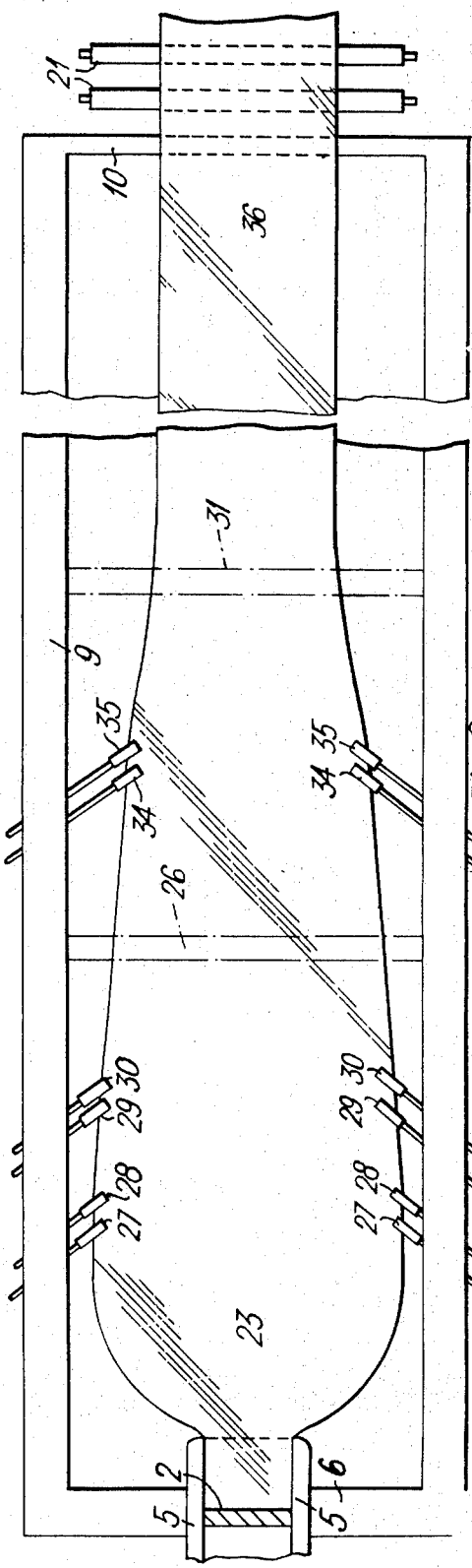
Fig. 1.
Fig. 2.

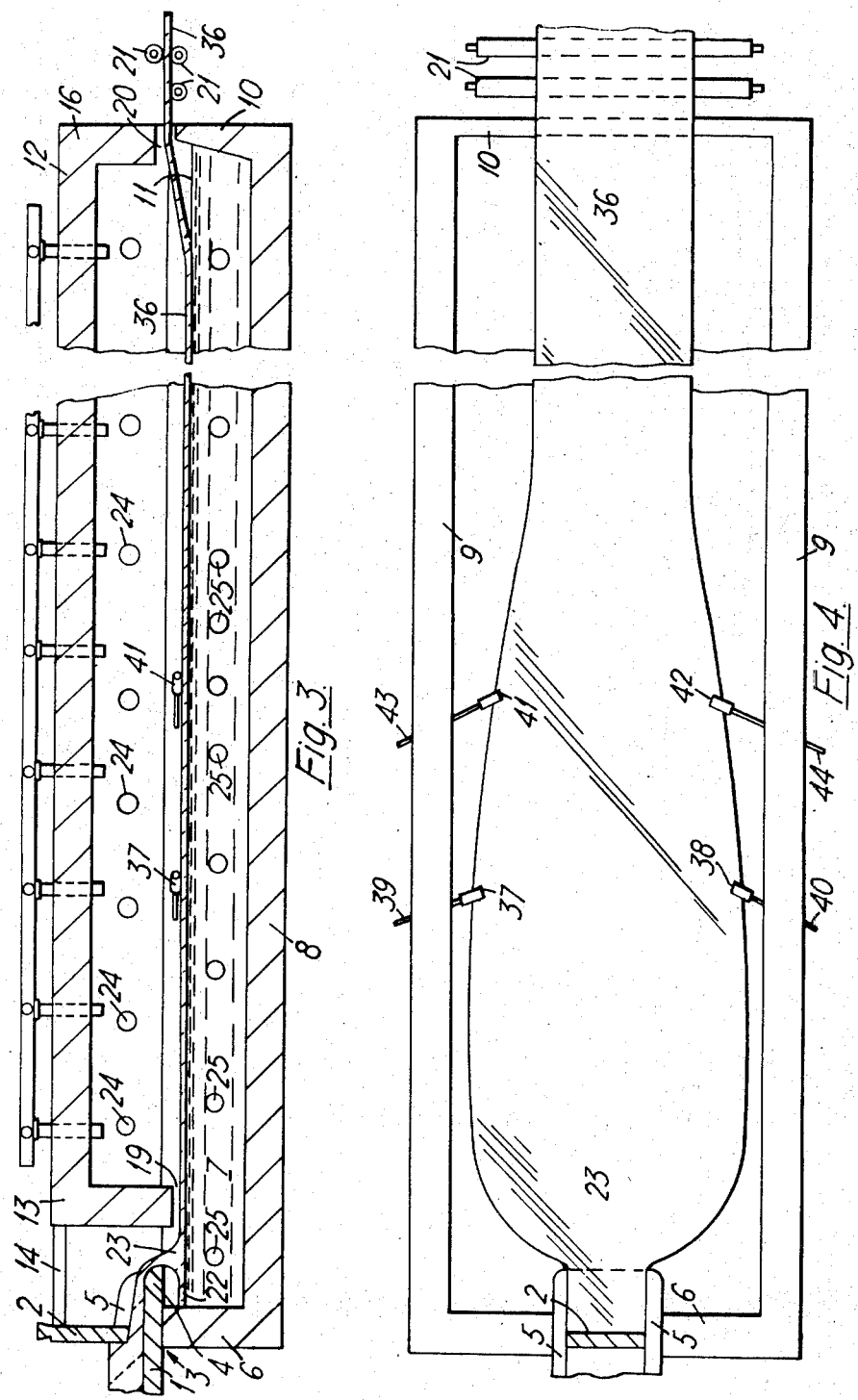

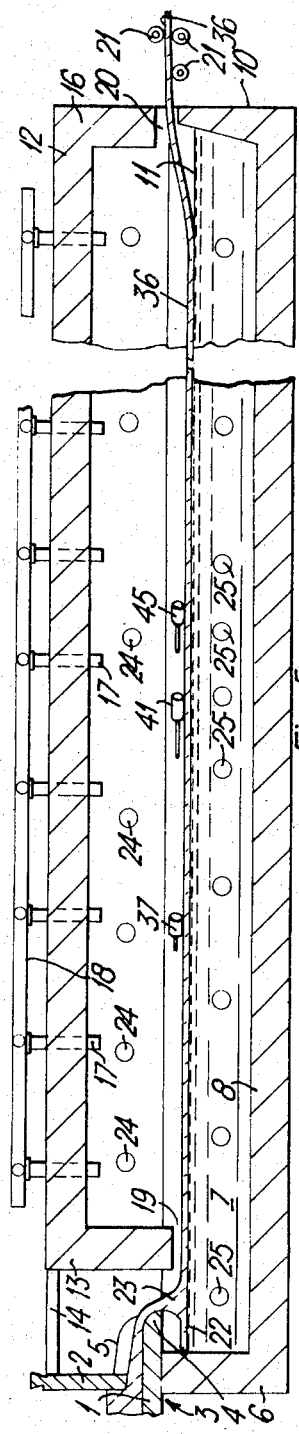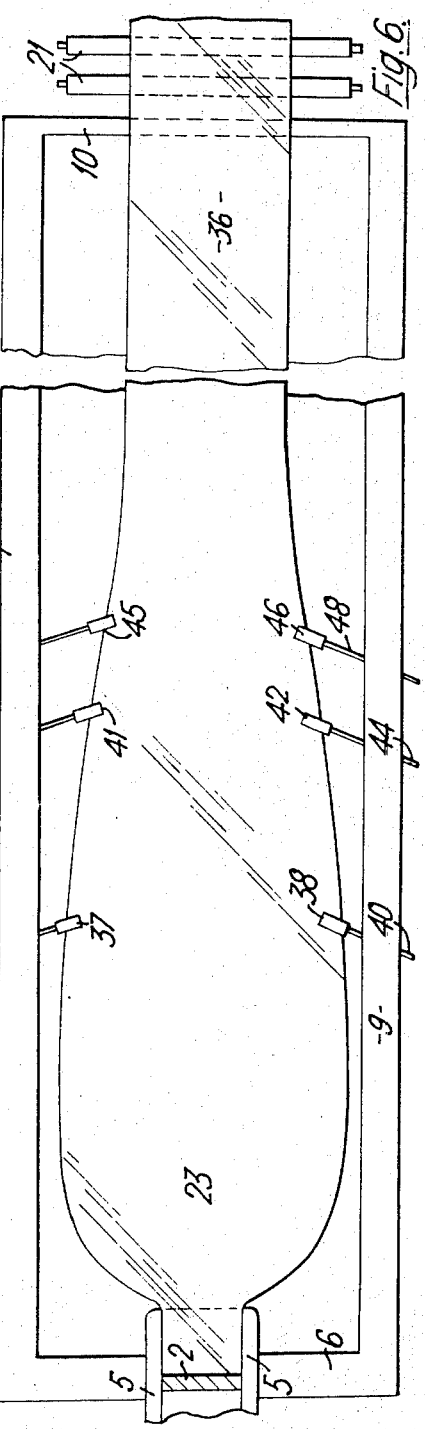

3,695,859
MANUFACTURE OF FLOAT GLASS
George Alfred Dickinson, Bryn Mair, Prescot Road, St. Helens, England, and Harold Charnock, 89 Chequer Lane, Up Holland, near Wigan, England
Filed July 24, 1970, Ser. No. 57,928
Claims priority, application Great Britain, July 28, 1969, 37,860/69
Int. Cl. C03b 18/02
U.S. Cl. 65—99 A         7 Claims

ABSTRACT OF THE DISCLOSURE

A method of manufacturing float glass of a desired width and thickness wherein molten glass is delivered at a controlled mass flow onto a molten metal bath to establish a molten glass layer and, while permitting the molten glass to flow freely laterally to its limit width and thickness, a glass ribbon is developed and subjected to a temperature regime while tractive force and outwardly and longitudinally directed forces are applied thereto. The ribbon advanced by the tractive force is discharged as a ribbon of a desired width and thickness at the same mass flow rate and with an increased final velocity. The advancing ribbon, which has a smooth edge profile defined by a never increasing width, includes an initial region contiguous with the molten glass layer and a terminal region contiguous with an attenuation region comprised of at least a downstream portion of the initial region. The outwardly and longitudinally directed forces are applied to the glass margins in the attenuation region where the glass is in a deformable state and is simultaneously thinned and reduced in width. Throughout the initial region, the glass is in a deformable or more fluid state. The magnitude of the outwardly and longitudinally directed forces is set, in relation to the applied tractive force and to the interfacial reaction forces between bath and ribbon, at a magnitude to progressively and gradually control simultaneous decrease in ribbon width and thickness throughout the attenuation region and to maintain the smooth edge profile defined by a never increasing width.

BACKGROUND OF THE INVENTION

(1) Field of the invention

This invention relates to the manufacture of float glass in which molten glass is poured at a controlled rate on to the inlet end of a bath of molten metal, and the molten glass on the bath is permitted to spread laterally unhindered to the limit of its free flow in order to develop a ribbon of float glass, which ribbon is cooled as it is advanced along the bath for eventual discharge from the bath.

Usually the bath of molten metal is a bath of molten tin or a tin alloy in which tin predominates.

The invention is concerned with the manufacture of float glass, of various thicknesses, and in particular the manufacture of thin float glass, that is float glass of thickness down to 2 mm. and below.

(2) Description of the prior art

Float glass down to 3 mm. thick has been produced by control of the viscosity gradient to which the advancing glass is subjected in relation to control of the tractive force applied to the ultimate ribbon of glass produced. Decrease in thickness of the ribbon down to the desired thickness is accompanied by a decrease in width, and the dimensions of the ultimate ribbon of glass produced are to some extent controlled by the rate of feed of the glass to the inlet end of the bath.

In another method of producing thin float glass, the ribbon of glass is stiffened sufficiently to be gripped and the gripped stiffened ribbon provides a reaction to the tractive force which attenuates the glass when it has been reheated as it passes through a zone downstream of the region where it was stiffened and gripped.

Float glass from 7 mm. thick down to 3 mm. thick has been produced by these methods, all of which are varying the dimensions of the ribbon of float glass which is advancing along the bath from the hot inlet end of the bath.

It has now been discovered that the operation of the float process can be extended to produce even thinner float glass down to 2 mm. thick and below without impairing the distinguishing characteristics of float glass, namely flat parallel surfaces of fire-finish lustre and freedom from distortion, by a more gradual control of the attenuation of the ribbon than has been practiced hitherto, and by ensuring that the forces to which the glass is subjected do not interfere with the unhindered lateral flow which produces the initial float ribbon.

It is a main object of the present invention to provide such a process for manufacturing any thickness of float glass less than the thickness of the initial ribbon of glass developed by the unhindered lateral flow of molten glass on the bath.

A further object of the invention is to provide a high output of thin float glass, and in particular to provide a wider ribbon of thin float glass.

SUMMARY

The invention provides a method of manufacturing float glass of different thicknesses down to 1.5 mm. thickness by delivering molten glass at a controlled mass flow rate onto a bath of molten metal to establish a layer of molten glass on the bath surface; and while permitting the molten glass delivered to the bath to flow freely laterally to its limit width and thickness, developing the ribbon of float glass on a bath of molten metal, and applying tractive force to the ribbon to advance the glass along the bath to discharge a ribbon of desired width and thickness and from the bath at the same mass flow rate and with increased final velocity, and applying outwardly and longitudinally directed forces to the margins of the glass in an attenuation region where the glass is simultaneously thinned and reduced in width. The advancing glass defines the advancing ribbon with a smooth edge profile defined by a never increasing width, and including an initial region contiguous with the layer of molten glass and a terminal region contiguous with the initial region, and having the desired width and thickness. At least the downstream portion of the initial region comprises the aforementioned attenuation region. In some instances (see e.g., FIG. 2), the attenuation region is established throughout the initial region, while in other instances (see e.g., FIG. 4), the advancing ribbon remains substantially at its limit width in the initial portion of the initial region. In both events, however, the ribbon width and thickness in the initial region is no greater than the aforementioned limit width and thickness. The advancing ribbon of glass is subjected to a temperature regime which maintains the glass in a deformable state over a length of the ribbon in which the glass is attenuated as it accelerates. The glass is in a deformable or more fluid state throughout any remaining portion of the initial region.

Forces acting on the glass over that ribbon length regulate gradual reduction in ribbon width and provide reaction to the attenuating forces acting on the glass, so providing progressive control of the attenuating effect of the tractive force and thereby effecting gradual attenuation of the ribbon to a desired width and thickness. The magnitude of the outwardly and longitudinally directed forces is set in relation to the tractive force and to interfacial reaction forces between the bottom surface of the advancing ribbon and the bath surface sufficiently to progressively and gradually control the simultaneous reduction in width and thickness of the advancing glass ribbon throughout the attenuation region, and to maintain the smooth edge profile of the ribbon defined by a never increasing width.

The method of the invention can be used for producing float glass of thickness from 6 mm. downwards. More particularly the invention provides float glass of thickness in the range 3 mm. to 1.5 mm. produced by the method described above.

The invention is particularly effective to produce 2 mm. thick float glass and the invention further comprehends 2 mm. float glass so produced.

According to the present invention, float characteristics are maintained in the glass throughout its production, and distortion of the glass surfaces is avoided.

BRIEF DESCRIPTION OF THE DRAWINGS

FIG. 1 is a sectional elevation of apparatus for carrying out the invention comprising a tank structure confining a bath of molten metal, a roof structure over the tank structure, and apparatus for pouring molten glass at a controlled rate on to the bath and for removing the ultimate ribbon of thin float glass from the bath.

FIG. 2 is a plan view of the tank structure of the apparatus of FIG. 1 with the roof structure removed, FIG. 3 is a sectional elevation similar to FIG. 1 showing a modified form of the apparatus for carrying out the invention, FIG. 4 is a plan view, similar to FIG. 2, of the apparatus of FIG. 3, FIG. 5 is a sectional elevation similar to FIG. 1 of yet another modified form of apparatus for carrying out the invention, and FIG. 6 is a plan view, similar to FIG. 2, of the apparatus of FIG. 5.

DESCRIPTION OF THE PREFERRED EMBODIMENTS

Referring to FIGS. 1 and 2 of the drawings a forehearth of a continuous glass melting furnace is indicated at 1 and a regulating tweel at 2. The tweel regulates the flow of molten glass along a spout 3 which comprises a lip 4 and side jambs 5. The side jambs and lip together form a spout of generally rectangular cross-section.

The spout is disposed over one end wall of a tank structure containing a bath 7 of molten metal for example molten tin or a molten tin alloy in which tin predominates. The tank structure further comprises a floor 8, side walls 9 and an end wall 10 at the outlet end of the bath. The floor 8, side walls 9 and end walls 6 and 10 together form an integral tank structure. The level of the bath of molten metal 7 is indicated at 11, and the configuration of the tank structure is such that the distance between the side walls 9 of the tank structure is always greater than the width of the glass on the bath so that the width of the surface of the bath of molten metal is always sufficiently great to permit unhindered lateral flow of the molten glass on the bath.

The tank structure supports a roof structure including a roof 12, an end wall 13 at the inlet end of the bath, a roof section 14 over the spout 3 and side walls 15, and an end wall 16 at the outlet end of the bath. The roof structure thus provides a tunnel over the bath which defines a headspace over the bath in which a protective atmosphere supplied through ducts 17 connected to a header 18 is maintained at a plenum. The inlet end wall 13 at the inlet end of the bath defines with the surface 11 of the molten metal bath an inlet 19 of restricted height through which the layer of molten glass established on the bath is advanced, and the outlet end wall 16 of the roof structure defines together with the outlet end wall 10 of the tank structure, an outlet 20 which is restricted in height and through which the ultimate ribbon of thin glass taken up from the bath surface is discharged on to traction rollers 21 mounted in known manner at the level of the outlet 20 from the bath beyond the outlet end of the tank structure.

The vertical spacing of the lip 4 of the spout above the surface 11 of the molten metal bath is of the order of 15 cm. and ensures that a heel 22 of molten glass is formed behind the glass, e.g. soda-lime-silica glass, flowing down the spout on to the bath, which heel 22 extends rearwardly under the spout lip to the end wall 6 of the tank structure. The free fall of the molten glass from the spout lip on to the bath surface ensures that glass which has formed the undersurface of the glass on the spout flows rearwardly whereas the glass which has formed the upper surface of the glass on the spout continually flows forwardly into the upper surface of a layer 23 of molten glass which is established on the bath surface by the molten glass poured from the spout. In this way bottom surface distortion derived from physical contact of molten glass with the spout is minimal in the molten glass establishing all but the very marginal regions of the layer 23 and any distortion becomes embodied in the extreme margins of the layer of molten glass on the bath.

Temperature regulators 24 in the headspace over the bath at the inlet end, and 25 in the bath itself establish thermal conditions at the inlet end of the bath such that the molten glass is enabled to flow freely laterally unhindered to the limit of its free flow during the first part of its advance along the bath.

The temperature regulators 24 and 25 are adjusted to set up along the bath a temperature regime to which the glass is subjected as it is advanced along the bath which temperature regime maintains the glass in a deformable state over a longitudinally extending region of the ribbon in which the glass is progressively attenuated as its velocity increases to produce the ultimate ribbon of float glass. The temperature regime generally constitutes a gradual decrease in the temperature of the glass as it passes along the bath but adjustment of the regulators 24 and 25 may be effected locally for example to provide for some reheating of the ribbon during its attenuation.

The method of operating illustrated in FIGS. 1 and 2 is for producing float glass which is 3 mm. thick. Molten soda-lime-silica glass is poured on to the surface of the bath of molten metal 7 at a rate of about 3000 tonnes ($3 \times 10^6$ kg.) per week and the glass flows outwardly after arriving on the bath surface to a width of about 6.4 m. This width is achieved when the glass reaches the limit of its free flow under the action of forces of surface tension and gravity as well as motive forces advancing the glass down the bath. The position where the free lateral flow ends is about 4.5 m. down the bath. The temperature of the glass in this region is about 1025° C. and the glass thickness is just below 7 mm.

The layer 23 of molten glass so formed on the bath is advanced in ribbon form and the nascent ribbon so formed is constituted by low viscosity glass, e.g. at a viscosity of $10^{4.2}$ poises.

During the initial advance of the nascent ribbon along the bath at a velocity of 2.5 m./minute the glass in that ribbon is thermally regulated by means of the regulators 24 and 25 to cool the glass gradually. For some distance the glass is still at such a low viscosity that any tendency to reduction in width due to the applied tractive force acting from the outlet end of the bath would, unless restrained, be supplemented by a tendency of the glass to flow inwardly so as to retain the thickness of the glass at the same value as was achieved when unhindered lateral flow had stopped. In this example during the first 18 m. of advance of the glass along the bath it is subjected to a temperature gradient which brings the glass temperature down to about 840° C. corresponding to a viscosity of $10^6$ poises. By the time the glass reaches this higher viscosity the tendency of the glass to flow inwardly to regain its initial thickness is considerably reduced.

The position at which the glass reaches the viscosity of about $10^6$ poises is defined by a partition 26 which extends right across the headspace and depends downwardly from the roof structure close to the surface of the ribbon of glass advancing along the bath. The partition 26 is, in the embodiment illustrated, at a distance of 18 m. from the inlet end wall of the tank structure. The drawings are not to scale and are illustrative only.

For most of its advance over the initial 18 m. of the bath the viscosity of the molten soda-lime-silica glass is in the range $10^4$ to $10^5$ poises and as its viscosity increases above $10^5$ poises the longitudinally directed tractive force which is transmitted upstream by the ribbon of glass from the rollers 21 at the outlet end, becomes more effective to stretch the ribbon because the viscosity is increasing to a value at which the glass is capable of supporting greater attenuating forces.

Initially however where the glass is at a lower viscosity, in order to maintain the width of the glass a pair of inclined top rolls 27 and 28 is mounted at each side of the tank structure at a distance of about 9 m. from the inlet end wall 6. These top rolls are knurled graphite or stainless steel rolls mounted on shafts which extend through the tank side walls and the top rolls engage the upper surface of the margins of the ribbon of glass soon after the nascent ribbon has begun its advance along the bath.

In this region the glass temperature is about 950° C. and the viscosity of the glass about $10^{4.6}$ poises. The top rolls are set at an angle e.g. 5° to 7° (exaggerated in the drawing) to an axis at right angles to the direction of advance of the ribbon, and apply outwardly and longitudinally directed forces to the margins of the nascent ribbon. The rolls 27 and 28 are driven at a rate such that they advance the margins of the glass at a speed of about 2.9 m./minute, and the outwardly directed force components provide restraint against undue loss of width.

The width of the glass was reduced to about 6.1 m. and there has been a small decrease in the thickness of the glass due to the effect of tractive forces slightly attenuating the glass against a reaction provided by interfacial forces between the advancing glass and the bath supplemented by some reaction provided by the top rolls 27 and 28.

Mounted 4.5 m. down the bath from the top rolls 27 and 28 there are further pairs of top rolls 29 and 30 which act similarly on the margins of the advancing glass which is at a slightly lower temperature for example about 900° C. at which temperature the viscosity of the glass is about $10^{5.2}$ poises. The glass is still in a condition at which there is a tendency for reduction in width due to surface tension forces as well as due to the attenuating effect of the tractive force. The top rolls 29 and 30 are set at an angle and are driven to advance the glass at a speed of 3.5 m./minute and the siting of the top rolls is such as to maintain the width of the ribbon at about 6 m. while the thickness of the glass has been decreased down to about 6 mm. by the time the glass passes beyond the top rolls 29 and 30.

Throughout its advance the character of the glass is maintained during the acceleration of the glass from a speed of 2.5 m./minute where unhindered lateral flow takes place to the speed of 3.5 m./minute as the glass passes downstream of the top rolls 29 and 30.

Cooling of the glass continues as the glass advances towards the partition 26 and by the time the glass passes under the partition 26 it has a width of 5.4 m. and a diminished thickness just below 6 mm.

Between the partition 26 and a further similar partition 31 located dowstream at a distance of 12 m. from the partition 26 there is a defined reheat zone in which roof heaters 32 and bath heaters 33 are effective to reheat the glass to a temperature of about 870° C. during its advance.

The rollers 21 at the outlet end of the bath discharge the ultimate ribbon 36 of thin float glass from the bath at a speed of 12.5 m./minute. There is thus a massive acceleration of the glass in the reheat zone and the glass is rapidly thinned down to 3 mm. thickness by the time it passes beneath the partition 31. The glass reaches the maximum reheat temperature of 870° C. where its viscosity is about $10^{5.6}$ poises, about half-way along the reheat zone and when in this state it is engaged by further pairs of marginal top rolls 34 and 35 which apply marginal forces to the glass which act longitudinally and transversely of the ribbon and provide progressive reaction to the attenuating effect of the tractive force acting on the marginal glass, and prevent undue loss of width during the rapid acceleration and thinning of the glass. The longitudinally directed reaction to the attenuating effect of the tractive force supplied by the top rolls 27, 28 and 29, 30, as well as the interfacial forces existing between the ribbon of glass and the bath augment the marginal forces exerted by the top rolls in engendering a distribution of effective reaction longitudinally of the region in which the glass is being attenuated which regulates progressive attenuation of the glass to a desired thickness.

The setting of the speed of the top rolls at each location where the margins of the ribbon of glass are engaged, is always related to the mass flow rate of delivery of glass to the bath, the speed at which the ribbon 36 is discharged from the bath and the setting of the temperature regime, to produce, in effect, a "tuned" system in which the forces applied to the margins of the glass at each location are related to the other accelerating forces acting on the glass at that location as well as the reaction to attenuation due to interfacial glass/metal forces effective at that location.

By the time the glass is passing beneath the partition 31 it has lost width to 3.5 m. and is 3 mm. thick. The heaters 32, 33 associated with the reheat zone are regulated so that the temperature of the ribbon of glass passing beneath the partition 31 is for example about 830° C. and the glass viscosity is about $10^{6.2}$ poises so that the glass is becoming thermally stabilised. Cooling of the glass continues during its further advance beyond the partition 31 and no further change in width and thickness takes place. The glass is moving at the high speed of 12.5 m./minute during the rest of its advance along the bath. The glass is cooled to about 650° C. by the time it reaches the outlet end of the tank structure.

The high speed of the thin ribbon of 3 mm. glass along the bath surface, and the rapid acceleration of the glass as it is attenuated, ensures effective longitudinal distribution of reaction to attenuating forces, which reaction is provided by interfacial forces between the bottom surface of the glass and the surface of the bath of molten metal. The attenuation of the glass in the reheat zone takes place against the reaction provided by these interfacial forces acting in conjunction with the three sets of top rolls 27, 28; 29, 30; 34, 35. Only just sufficient traction is transmitted upstream of the partition 26 to ensure the advance of the nascent ribbon along the upstream hot region of the bath, although the existence of small tractive force acting in that region necessarily produces some reduction in thickness of the nascent ribbon as described above, while the glass is laterally restrained by the action of the top rolls 27, 28 and 29, 30.

The sets of top rolls 27, 28; 29, 30; and 34, 35 are all mounted at an angle to the side walls of the tank structure. This angle may be from 0° to 10° to a direction at right angles to the direction of advance of the ribbon. Even when the axes of the top rolls are at right angles to the tank side walls, the rolls are effective to apply outwardly and longitudinally directed forces to the glass because of the edge profile of the ribbon of glass, which has a gradually reducing width, when viewed in plan.

In the embodiment illustrated in FIGS. 3 and 4 another method of producing float glass which is 3 mm. thick is illustrated. Molten glass is poured on to the surface of the bath of molten metal at a mass flow rate of 2,600 tonnes per week and after its arrival on the bath the glass flows outwardly to form the layer 23 on the bath surface which has a width of 6.35 m. This width is achieved when the glass reaches the limit of its free flow under the action of surface tension and gravity as well as motive forces which advance the glass down the bath. Free flow has ceased after the glass has travelled about 4.5 m. down the bath. The temperature of the glass in this region is about 1025° C. and the glass thickness is just below 7 mm.

Just enough tractive force from the outlet end of the bath is transmitted upstream to advance the glass in ribbon form at the same width as was achieved at the limit of the free flow and during this advance the glass gradually cools under the influence of the temperature regime until its viscosity increases to a value at which the glass is in a deformable state. Initially, when the glass is soda-lime-silica glass the viscosity of the glass during its unhindered lateral flow is about $10^{4.2}$ poises and during the advance of the glass along the first 15 m. of the bath the temperature of the glass is reduced to about 870° C. at which temperature the viscosity of the glass is about $10^{5.5}$ poises. At this order of viscosity longitudinally directed tractive forces become more effective to deform the ribbon.

When the glass reaches this state it enters the region of the ribbon in which the glass is progressively attenuated and in order to control the attenuation, forces are applied to the margins of the ribbon to set both the magnitude and direction of the velocity of the glass in the ribbon margins at a particular location. This location is specified by the provision of a pair of inclined top edge rolls 37 and 38 which are located at a distance of about 15 m. from the inlet end wall 6 of the tank structure. Each of the top rolls is mounted at the end of a shaft, respectively 39 and 40, which shafts are mounted in glands extending through the side walls 9 of the tank structure. The top rolls are mounted opposite each other and are inclined at an angle of 5° to the transverse direction so that they exert outwardly and longitudinally directed force components on the margins of the ribbon. The top rolls 37 and 38 are driven at a rate such that the forward velocity of the margins of the glass is 2.5 m./minute, and the temperature of the glass as it is engaged by the top rolls is about 870° C. The width of the glass is gradually reducing to about 6.1 m. and a small decrease in the thickness of the ribbon is evident.

As the glass passes beyond the top rolls 37 and 38 the temperature falls gradually to about 810° C. and throughout its advance the progressive attenuation of the ribbon continues. In order to ensure gradual decrease in the width of the ribbon as the glass is attenuated further top rolls 41 and 42 are provided at a distance of about 9 m. downstream from the top rolls 37 and 38. The rolls 41 and 42 are respectively mounted at the ends of shafts 43 and 44 which are also carried by glands in the tank side walls 9 and are inclined at an angle of 7° to the transverse direction of the tank.

The top rolls 41 and 42 are both driven in synchronism at a rate such that they set the forward velocity of the margins of the glass in an inward direction as illustrated at a speed of 3.9 m./minute. Before the glass reaches the location of the top rolls 41 and 42 it is reheated slightly to about 830° C. by the setting of the temperature regime so as to increase the effectiveness of the forces applied by the top rolls 41 and 42 in providing restraint to decrease in width of the ribbon as it is attenuated.

During the passage of the glass along the part of the region between the location of the top rolls 37 and 38 and the location of the top rolls 41 and 42 the glass is accelerating and the speed of the top rolls 41 and 42 is set in relation to the speed setting of the top rolls 37 and 38 to provide reaction to the attenuating effect of the tractive forces acting longitudinally upstream from the oulet end of the bath so that there is a gradual build-up of the attenuating effect of the acceleration of the glass while the marginal forces applied are "tuned" as described above.

The marginal forces applied by the top rolls thus prescribe a distribution of effective reaction to the attenuating effect of the tractive force, longitudinally of the region where the glass is deformable.

After the glass passes downstream of the top rolls 41 and 42 it is further cooled through a temperature of 820° C. down to about 780° C. which temperature is achieved when the glass has advanced for about another 9 m. At this temperature the glass has a viscosity of about $10^{6.8}$ poises at which viscosity it is no longer deformable under the effect of the tractive force which is applied to the ultimate ribbon of glass by the rollers 21 at the outlet end. These rollers are driven to discharge the ribbon of thin glass 36 from the bath at the same mass flow rate of 2,600 tonnes per week as the molten glass was poured on to the bath, but with a greatly increased velocity of 12 m./minute. There is a rapid acceleration of the glass after it passes beyond the top rolls 41 and 42 in order to achieve this forward velocity of 12 m./minute by the time the glass has been stiffened sufficiently to hold its dimensions. The ribbon 36 is 3.1 m. wide and 3 mm. thick. The float quality achieved in the layer 23 by unhindered lateral flow is preserved throughout attenuation of the ribbon. The top rolls provide reaction to the attenuating force as well as the controlling gradual decrease in width of the ribbon so that as shown in FIG. 4 the ribbon of glass has a smooth edge profile which indicates that the forces operating on the glass are producing gradual changes in the dimensions of the glass which, coupled with the continuous nature of the gradual increase in viscosity of the glass as it is being attenuated, ensures that the float characteristics are maintained in the glass throughout its production.

The gentle thermal treatment of the ribbon of glass throughout its advance reduces the possibility of distortion being introduced into the surfaces of the glass by the attenuating method. There is an incidental benefit in that if the top roll arrangements should become inoperative, for example by losing contact with the edges of the ribbon, the only consequence is an increase in thickness, so that the method provides a "fail safe" method which in the event of a failure, merely results in the production of float glass of usual thickness in the region 6 mm. to 7 mm.

The thin ribbon 36 is cooled to about 600° C. by the time it reaches the outlet from the tank, and the velocity of 12 m./minute at which the ribbon is discharged ensures that reaction forces are generated between the glass and the molten metal surface throughout the whole region where the glass is being attenuated. Even where the forward velocity of the glass is much lower near the hot inlet end of the bath, such interfacial forces as exist between the low viscosity glass and the molten metal, are effective in the process because of the lower viscosity of the glass.

The viscosity of the glass where it is engaged by the top rolls is such that the control exercised on the forward velocity of the ribbon is effective right across the ribbon. The marginal forces applied by the top rolls 41 and 42 and interfacial forces existing between the glass and the metal in and downstream of that region, combine to provide effective reaction to attenuating forces acting on the glass downstream of the top rolls 41 and 42.

Similarly the effect of the top rolls 37 and 38 extends across the ribbon to control the ribbon velocity and provide effective reaction to attenuating forces acting on the zone of the ribbon between the rolls 37, 38 and the rolls 41, 42. The angular velocity of the top rolls 37 and 38 is also set, in the course of "tuning" the process to produce the desired glass width and thickness, to regulate the earlier stage of the progressive attenuation of the ribbon. That is, the interfacial reaction forces supplement the reaction provided by the top rolls 37, 38 and 41, 42 and are taken into account when determining the setting of the angle and speed of the top rolls so as to ensure that the required distribution of effective reaction is achieved longitudinally of the region where the ribbon is being attenuated. Only sufficient traction is transmitted upstream of the top rolls 37 and 38 to ensure the advance of the initial float ribbon at its initial velocity of about 2.5 m./minute along the hot region of the bath.

FIGS. 5 and 6 illustrate a modification in which the distribution of effective reaction in the attenuating region is enhanced by the provision of a further pair of top rolls 45 and 46. The first pair of top rolls 37 and 38 is located in about the same position as in FIGS. 3 and 4, as is the second pair of top rolls 41 and 42. The scale of FIGS. 5 and 6 is compressed as compared with FIGS. 3 and 4. The further pair of top rolls 45 and 46 is positioned about 4.5 m. downstream of the second pair 41 and 42 and the shafts 47 and 48 of this third pair 45 and 46 extend further into the tank structure although at the same angle of 7° as the shafts of the rolls 41 and 42.

The margins of the glass are thus further controlled during the final stage of attenuation where the velocity of the glass is increasing rapidly.

With this arrangement of three pairs of top rolls 3 mm. glass can be produced at the same mass flow rate of 2,600 tonnes per week. The layer of float glass is produced having its usual thickness of about 6 mm. to 7 mm. and this layer is cooled, as it is advanced towards the top rolls 37 and 38, to about 860° C. The top rolls 37 and 38 are driven to impart a forward velocity of 2.8 m./minute to the margins of the ribbon and downstream of the top rolls 37 and 38 the glass is firstly cooled through 825° C. down to about 820° C. which is the temperature of the glass as it advances towards the location of the second pair of top rolls 41 and 42. These rolls are driven to impart a forward velocity of 4.4 m./minute to the margins of the glass and because of their angle of 7° are also applying a transversely acting restraint to control the gradual decrease in the width of the ribbon as the glass is accelerated.

Before passage to the location of engagement by the third pair of top rolls 45 and 46 the glass is warmed to about 840° C. The rolls 45 and 46 are driven to impart a forward velocity of 5.6 m./minute to the margins of the glass and thereafter the glass is maintained at about 815° C. during its further acceleration to the final ribbon velocity of 10 m./minute.

At each of the succession of locations where the ribbon is controlled by the top rolls, there is an outward component of force, and the velocity of the ribbon at each location is so related to the ribbon velocity at the other locations that there is provided at each location effective reaction to the attenuating forces at the succeeding location.

The setting and interaction of forces along the whole ribbon thus provides a distribution of effective reaction to provide progressive control of the attenuating effect of the tractive force acting on the deformable glass. This ensures a smooth edge profile of the ribbon indicating gradual attenuation of the ribbon to the desired width and thickness under a gently falling temperature regime. The width of the final ribbon 36 which is 3 mm. thick is 3.3 m. and the gradual decrease in width to this final width under the action of the top rolls ensures that distortion of the glass surfaces during the rapid attenuation of the glass, is avoided.

The apparatus illustrated in FIGS. 5 and 6 can be adapted for the production of thinner glass by simple adjustment of the speed of the three pairs of top rolls and of the traction rollers 21 at the outlet end. For the production of a ribbon of glass 2.5 mm. thick and 2.8 m. wide with the same mass flow rate of 2,600 tonnes per week and the same temperature regime, the top rolls 37 and 38 are directed to impart a marginal forward velocity of 2.8 m./minute, the top rolls 41 and 42 a velocity of 4.2 m./minute and the top rolls 45 and 46 a velocity of 5.4 m./minute. The rollers 21 are driven to discharge the ribbon at a speed of 15 m./minute and it has been found that there is no deterioration in the quality of the thin float glass so produced.

Float glass of thickness 2 mm. and width 2.8 m. is produced by further adjustment of the inter-related velocities. With the same mass flow and temperature regime and with the ribbon being discharged from the bath at 18 m./minute, the top rolls 26 and 27 are driven at a slightly increased speed of 3.1 m./minute, the second rolls 30 and 31 to give a velocity of 5.3 m./minute and the third pair of rolls 37 and 38 to give a velocity of 6.7 m./minute. At these higher speeds the increased interfacial reaction forces are effective in ensuring that there is still the required distribution of effective control longitudinally of the region where the glass is being rapidly attenuated down to its ultimate 2 mm. thickness, without the rapid acceleration in any way upsetting the initial production of the float characteristics at the hot end of the bath.

The effective engagement of the margins of the ribbon by the top rolls to set both the magnitude and direction of the velocity of the glass at the margins of the ribbon at each location is achieved by using knurled graphite rolls although where higher speeds are to be imparted to the ribbon margins sharp toothed edge rolls of heat-resistant stainless steel are employed. These ensure effective regulation of the marginal velocity of the glass, in particular at the high velocities necessary for the production of 2 mm. glass in order to control the acceleration of the ribbon margins at the same rate as the central region of the ribbon.

The angular settings of the top rolls which are described are those preferred. The setting of the first pair of top rolls in each embodiment may be in the range 0° to 5°, and for the second and subsequent pairs of top rolls, in the range 5° to 10°.

By further adjustment of operating speeds of the traction rollers 21 and the sets of top rolls without any major trimming of the temperature regime, even thinner glass can be produced, for example down to 1.5 mm. thickness at an output speed of the order of 28 m./minute. If desired more top rolling locations are provided by inserting further sets of top rolls to assist the distribution of effective reaction to attenuating forces in the deformable region of the ribbon and ensure that there is still the gradual build-up of the attenuating effect of the acceleration of the glass which acts uniformly transversely of the glass even at the high speeds necessary for the production of the thinner 1.5 mm. glass which for example is discharged from the bath at about 24 m./minute.

From the foregoing, it will be appreciated that in all these methods of practicing the invention, the advancing glass defines and advancing ribbon with a smooth edge profile defined by a never increasing width. In this connection, it will be recalled that the ribbon of FIG. 2 has a gradually reducing width throughout the initial region existing between the layer 23 of molten glass and the terminal region wherein the ribbon has the desired width and thickness, i.e. the entire initial region comprises an attenuation region. The ribbons of FIGS. 4 and 6 also have gradually reducing widths in the attenuation region. However, it will be apparent that the attenuation region only comprises a downstream portion of the initial region existing between the layer 23 of the molten glass and the terminal region of the ribbon, insofar as the ribbon, it will be recalled, advances initially at substantially the same width as was achieved at the limit of free flow. In any event, as earlier noted, the smooth edge profile of the ribbon indicates gradual attenuation of the ribbon to the desired width and thickness, with the gradual decrease in width ensuring against distortion of glass surfaces. Moreover, operation according to the present invention does not upset initial production of the float characteristics at the hot end of the bath. It is additionally noteworthy that in all these methods of operating the invention if edge contact is lost the ribbon returns towards the basic 7 mm. thickness and the continuation of production of the thin float glass is rapidly resumed as soon as engagement of the margins of the glass by the top rolls is resumed.

This "fail safe" characteristic of the process is important at the high speeds of operation in particular as it will be appreciated that the annealing lehr through which the ribbon of float glass is advanced is being driven at the same high speed as the traction rollers 21.

The invention thus provides in effect an improved "Universal" method for the manufacture of float glass of all thicknesses enabling float glass to be produced in thicknesses from 6 mm. down to 1.5 mm. thickness and below. A change in glass thickness produced is brought about by changes in the setting and velocity of the top rolls without any major alteration to the temperature regime so that any change can be rapidly effected without appreciable loss of production. The glass produced has at all thicknesses excellent distortion free surfaces of fire-finish lustre and can be used after bending and toughening for the production of laminated glass articles, for example laminated windscreens, with no difficulties in matching pairs of glasses due to the excellent surface characteristics of the glass.

We claim:
1. A method of manufactured float glass comprising:
   (A) delivering molten glass at a controlled mass flow rate onto a bath of molten metal to establish a layer of molten glass on the bath surface;
   (B) while permitting the molten glass delivered to the bath to flow freely laterally to its limit width and thickness,
      (1) developing a ribbon of glass on the bath,
      (2) applying tractive force to the ribbon
         (a) to advance the glass along the bath, and
         (b) to discharge a ribbon of glass of a desired width and thickness at the same mass flow rate and with an increased final velocity so that the advancing glass defines an advancing ribbon with a smooth edge profile defined by a never increasing width and including:
            (i) an initial region contiguous with said layer of molten glass and having a ribbon width and thickness no greater than said limit width and thickness, with at least a downstream portion of said initial region comprising an attenuation region wherein the advancing ribbon is continuously and simultaneously thinned and reduced in width, and
            (ii) a terminal region contiguous with said attenuation region and having said desired width and thickness, and
      (3) applying outwardly and longitudinally directed forces to the margins of the glass in said attenuation region where the glass is simultaneously thinned and reduced in width;
   (C) subjecting the advancing ribbon of glass to a temperature regime which maintains the glass in a deformable state throughout said attenuation region and in a deformable or more fluid state throughout any remaining portion of said initial region, and
   (D) setting the magnitude of said outwardly and longitudinally directed forces in relation to said applied tractive force and to interfacial reaction forces between the bottom surface of said advancing ribbon and the bath surface sufficient to progressively and gradually control the simultaneous decrease in width and thickness of the advancing glass ribbon throughout said attenuation region and to maintain said smooth edge profile defined by a never increasing width.

2. The method according to claim 1 wherein the tractive force is applied to establish said attenuation region throughout said initial region.

3. The method according to claim 1 wherein the tractive force is applied to establish said attenuation region downstream of an initial portion of said initial region wherein said advancing ribbon remains substantially at its limit width.

4. The method according to claim 1 wherein:
the step of subjecting the advancing ribbon to the temperature regime comprises gradually cooling the glass of the advancing ribbon in an initial portion of said initial region and thereafter reheating the glass of the advancing ribbon in at least a portion of said attenuation region, and wherein
outwardly and longitudinally directed forces are applied to the margins of the glass in said initial portion of said initial region and adjacent the reheated portion of said attenuation region.

5. The method according to claim 4 wherein:
the application of said outwardly and longitudinally directed forces at said initial portion of said initial region partially restrains the tendency of said glass to flow inwardly and reduce the ribbon width, and
the tractive force is applied to provide a rapid acceleration of the glass adjacent the reheated portion of the said attenuation region while the application of said outwardly and longitudinally directed forces adjacent the reheated portion provides progressive reaction to the effect of the tractive force application in decreasing the width and thickness of the ribbon.

6. The method according to claim 1 wherein the outwardly and longitudinally directed forces are applied by engaging the upper surface only of the margins of ribbon.

7. The method according to claim 1 wherein the glass is delivered into the molten metal bath at a controlled mass flow rate of at least about 2600 tonnes per weak and is discharged at a thickness in the range of about 1.5 to 6 mm.

References Cited
UNITED STATES PATENTS

| | | | |
|---|---|---|---|
| 3,520,672 | 7/1970 | Greenler et al. | 65—182 X |
| 3,222,154 | 12/1965 | Pilkington | 65—91 |
| 3,083,551 | 4/1963 | Pilkington | 65—182 X |
| 3,486,869 | 12/1969 | Alonzo et al. | 65—182 X |

ROBERT L. LINDSAY, JR., Primary Examiner

U.S. Cl. X.R.
65—91